US006965379B2

(12) United States Patent
Lee et al.

(10) Patent No.: US 6,965,379 B2
(45) Date of Patent: Nov. 15, 2005

(54) N-VIEW SYNTHESIS FROM MONOCULAR VIDEO OF CERTAIN BROADCAST AND STORED MASS MEDIA CONTENT

(75) Inventors: Mi-Suen Lee, Ossining, NY (US); Tomas Brodsky, Croton-on-Hudson, NY (US); Daphna Weinshall, Ossining, NY (US); Miroslav Trajkovic, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 888 days.

(21) Appl. No.: 09/851,445

(22) Filed: May 8, 2001

(65) Prior Publication Data

US 2002/0167512 A1 Nov. 14, 2002

(51) Int. Cl.[7] .............................................. G06T 15/00
(52) U.S. Cl. ..................................................... 345/427
(58) Field of Search ........................ 345/427; 382/154

(56) References Cited

U.S. PATENT DOCUMENTS

| | | | | |
|---|---|---|---|---|
| 4,925,294 A | * | 5/1990 | Geshwind et al. ............. | 352/57 |
| 5,592,567 A | * | 1/1997 | Kilger ......................... | 382/199 |
| 5,629,988 A | | 5/1997 | Burt et al. | |
| 5,684,890 A | * | 11/1997 | Miyashita et al. ........... | 382/154 |
| 5,714,997 A | * | 2/1998 | Anderson ..................... | 348/39 |
| 5,915,044 A | | 6/1999 | Gardos et al. | |
| 6,008,865 A | | 12/1999 | Fogel | |
| 6,055,330 A | | 4/2000 | Eleftheriadis et al. | |
| 6,108,005 A | | 8/2000 | Starks et al. | |
| 6,157,733 A | * | 12/2000 | Swain .......................... | 382/154 |

FOREIGN PATENT DOCUMENTS

WO   WO 98/21893 A1   5/1998

OTHER PUBLICATIONS

Wexler et al. Image-based environment matting. ACM International Conference Proceeding Series. vol. 28. Proceedings of the 13th Eurographics workshop on Rendering. 2002. p. 279-289.*
Pless et al. , "Detecting Independent Motion : The Statistics of Temporal Continuity" IEEE Trans Pattern Analysis and Machine Intelligence, vol. 22, #8, Aug. 2000 pp 768-773.
Irani et al., " From Reference Frames to Reference Planes: Multi-View Parallax Geometry and applications " Proc. 5th European Conf. on Computer Vision, Freiburg Jun. 1998, pp 829-845.
J.D. Foley et al , Computer Graphics-Principle and Practice addison-Wesley, 2nd ed, 1972) selections from Ch 14.
"Stereo Vision", by O. Faugeros, Three Dimensional Computer Vision (MIT Press) Ch. 6.
V.S. Nalwa, "Image Segmentation", A Guided Tour of Computer Vision (Addison-Wesley 1993) §3.3.
"Image-Based Rendering and 3D Modeling: A Complete Framework" Izquierdo et al; Signal Processing, vol. 15, No. 10, Aug. 2000 P. 817-858.

* cited by examiner

Primary Examiner—Ulka J. Chauhan
Assistant Examiner—Peter-Anthony Pappas
(74) Attorney, Agent, or Firm—Dicran Halajian

(57) ABSTRACT

A monocular input image is transformed to give it an enhanced three dimensional appearance by creating at least two output images. Foreground and background objects are segmented in the input image and transformed differently from each other, so that the foreground objects appear to stand out from the background. Given a sequence of input images, the foreground objects will appear to move differently from the background objects in the output images.

30 Claims, 13 Drawing Sheets

FIG. 9

$$\left( \frac{h_{11}x + h_{12}y + h_{13}}{h_{31}x + h_{32}y + h_{33}}, \frac{h_{21}x + h_{22}y + h_{23}}{h_{31}x + h_{32}y + h_{33}} \right) \quad (1)$$

$$\mathbf{HL} = \begin{pmatrix} 1 & s_L & d_L \\ 0 & 1 & 0 \\ 0 & 0 & 1 \end{pmatrix} \quad (2)$$

$$\mathbf{HR} = \begin{pmatrix} 1 & s_R & d_R \\ 0 & 1 & 0 \\ 0 & 0 & 1 \end{pmatrix} \quad (3)$$

$$(s_L - s_R)y + d_L - d_R \quad (4)$$

$$\mathbf{TL} = \begin{pmatrix} s & 0 & \Delta_x \\ 0 & s & \Delta_y \\ 0 & 0 & 1 \end{pmatrix} \quad (5)$$

$$s = \frac{|A'x - B'x|}{|Ax - Bx|} \qquad \Delta_x = C'x - s \cdot Cx \qquad \Delta_y = C'y - s \cdot Cy \qquad (12)$$

$$\frac{s_L y_1 + d_L}{s_L y_2 + d_L} = \frac{w_1}{w_2} \qquad (13)$$

$$s_L(y_1 w_2 - y_2 w_1) + d_L(w_2 - w_1) = 0 \qquad (14)$$
$$s_L y_B + d_L = d_{MAX}$$

A"=(A"x, A"y)  (15)

B"=(B"x, B"y)  (16)

C"=(C"x, C"y)  (17)

$$\mathbf{TR} = \begin{pmatrix} s'' & 0 & \Delta''_x \\ 0 & s'' & \Delta''_y \\ 0 & 0 & 1 \end{pmatrix} \qquad (18)$$

FIG. 11

$$s'' = \frac{|A''x - B''x|}{|Ax - Bx|} \qquad \Delta''_x = C''x - s'' \cdot Cx \qquad \Delta''_y = C''y - s'' \cdot Cy \qquad (19)$$

$$vp_1 = ([sx_{11} \quad sy_{11} \quad 1] \times [ex_{11} \quad ey_{11} \quad 1]) \times ([sx_{12} \quad sy_{12} \quad 1] \times [ex_{12} \quad ey_{12} \quad 1]) \qquad (20)$$

$$vp_2 = ([sx_{21} \quad sy_{21} \quad 1] \times [ex_{21} \quad ey_{21} \quad 1]) \times ([sx_{22} \quad sy_{22} \quad 1] \times [ex_{22} \quad ey_{22} \quad 1]) \qquad (21)$$

$$a \times b \qquad (22)$$

$$H_a = \begin{bmatrix} 1 & 0 & 0 \\ 0 & 1 & 0 \\ h_1 & h_2 & 1 \end{bmatrix} \quad where \quad \begin{bmatrix} h_1 \\ h_2 \end{bmatrix} = \begin{bmatrix} x_1 & y_1 \\ x_2 & y_2 \end{bmatrix}^{-1} \begin{bmatrix} -w_1 \\ -w_2 \end{bmatrix} \qquad (23)$$

$$p_i = [px_i \quad py_i] \qquad (24)$$

$$p_i = \left[ \frac{px_i}{h_1 px_i + h_2 py_i + 1} \quad \frac{py_i}{h_1 px_i + h_2 py_i + 1} \right] \qquad (25)$$

FIG. 12

$$H_b = \begin{bmatrix} a & b & c \\ d & e & f \\ g & h & 1 \end{bmatrix} \text{ where } \begin{bmatrix} qx_1 & qy_1 & 1 & 0 & 0 & 0 & -px'_1 \cdot qx_1 & -px'_1 \cdot qy_1 \\ qx_2 & qy_2 & 1 & 0 & 0 & 0 & -px'_2 \cdot qx_2 & -px'_2 \cdot qy_2 \\ qx_3 & qy_3 & 1 & 0 & 0 & 0 & -px'_3 \cdot qx_3 & -px'_3 \cdot qy_3 \\ qx_4 & qy_4 & 1 & 0 & 0 & 0 & -px'_4 \cdot qx_4 & -px'_4 \cdot qy_4 \\ \cdot & \cdot & \cdot & \cdot & \cdot & \cdot & \cdot & \cdot \\ 0 & 0 & 0 & qx_1 & qy_1 & 1 & -py'_1 \cdot qx_1 & -py'_1 \cdot qy_1 \\ 0 & 0 & 0 & qx_2 & qy_2 & 1 & -py'_2 \cdot qx_2 & -py'_2 \cdot qy_2 \\ 0 & 0 & 0 & qx_3 & qy_3 & 1 & -py'_3 \cdot qx_3 & -py'_3 \cdot qy_3 \\ 0 & 0 & 0 & qx_4 & qy_4 & 1 & -py'_4 \cdot qx_4 & -py'_4 \cdot qy_4 \\ \cdot & \cdot & \cdot & \cdot & \cdot & \cdot & \cdot & \cdot \end{bmatrix} \begin{bmatrix} a \\ b \\ c \\ d \\ e \\ f \\ g \\ h \end{bmatrix} = \begin{bmatrix} -px'_1 \\ -px'_2 \\ -px'_3 \\ -px'_4 \\ \cdot \\ -py'_1 \\ -py'_2 \\ -py'_3 \\ -py'_4 \\ \cdot \end{bmatrix} \quad (26)$$

$$q_i = [qx_i \quad qy_i] \qquad (27)$$

$$q_i' = \left[ \frac{a \cdot qx_i + b \cdot qy_i + c}{g \cdot qx_i + h \cdot qy_i + 1} \quad \frac{e \cdot qx_i + f \cdot qy_i + g}{g \cdot qx_i + h \cdot qy_i + 1} \right] \qquad (28)$$

$$e_{12} = ([px_a' \quad py_a' \quad 1] \times [qx_a' \quad qy_a' \quad 1]) \times ([px_b' \quad py_b' \quad 1] \times [qx_b' \quad qy_b' \quad 1]) \qquad (29)$$

$$e_{12}' = H_a * \begin{bmatrix} 1 \\ 0 \\ 0 \end{bmatrix} \qquad (30)$$

$$e_{22}' = (1+w) \cdot e_{12} - w \cdot e_{12}' \qquad (31)$$

FIG. 13

$$r_i' = ([px_i' \quad py_i' \quad 1] \times e_{12}') \times ([qx_i' \quad qy_i' \quad 1] \times e_{22}') \tag{32}$$

$$r_i = \begin{bmatrix} 1 & 0 & 0 \\ 0 & 1 & 1 \\ 0 & 0 & 1 \end{bmatrix} H_a^{-1} \begin{bmatrix} 1 & 0 & d \cdot ex_{12}' \\ 0 & 1 & d \cdot ey_{12}' \\ 0 & 0 & 1+d \end{bmatrix} r_i' \tag{33}$$

N-VIEW SYNTHESIS FROM MONOCULAR VIDEO OF CERTAIN BROADCAST AND STORED MASS MEDIA CONTENT

I. BACKGROUND OF THE INVENTION

A. Field of the Invention

The invention relates to the field of synthesizing video material, particularly with a view to enhancing a three dimensional appearance of that material.

B. Related Art

Synthesizing the image of a 3-D scene, as it would be captured by a camera from an arbitrary viewpoint, is a well-known research problem and several different approaches have been proposed. Given a complete 3-D model, it is possible to render the scene from any viewpoint. Rendering techniques are well known in the field of Computer Graphics (as described, for example, in J. D. Foley, A. van Damm, S. K. Feiner, and J. F. Hughes, "Computer Graphics-Principles and Practice", Addison Wesley, Second Edition, 1992, Chapter 14). However, generation of the model is a tedious, error-prone and labor intensive task.

On the other hand, some researchers have tried to infer 3-D information directly from images. Various methods have been developed for recovering both the shapes of the objects and the camera motion from a sequence of images (for example, O. Faugeras, "Three-Dimensional Computer Vision: a Geometric Viewpoint", MIT press, 1993). These methods are typically computationally intensive. Furthermore, in many cases the input sequence had been captured by a pan-tilt-zoom camera, preventing recovery of the 3D model of the scene.

Another approach is to perform image based rendering (as in L. MacMillan: "An Image Based Approach to Three-Dimensional Computer Graphics", Ph.D. dissertation, University of North Carolina, 1997), in which case no explicit 3-D model of the object and the environment is required. These methods avoid reasoning in 3-D by using projective constraints and invariants.

II. SUMMARY OF THE INVENTION

It is an object of the invention to synthesize multiple views of a scene starting from a monocular video sequence.

This is achieved in that for each input image, two or more new views of the scene are generated. Such views are suitable for display on a 3D-TV device or any other suitable viewing apparatus. The input images are segmented into moving objects and a stationary background. The background may be further segmented into multiple regions. Applying appropriate transformations to each region generates new views. Advantageously, simple domain knowledge is used to create good approximations for the views, even when the necessary information is not available from the image sequence.

Further objects and advantages will be apparent in the following.

III. BRIEF DESCRIPTION OF THE DRAWING

The invention will now be described by way of non-limiting example with reference to the following drawings.

FIGS. 9–13 show some formulae that will be used in the description of the preferred embodiments.

IV. DETAILED DESCRIPTION OF THE PREFERRED EMBODIMENTS

Figure 1:
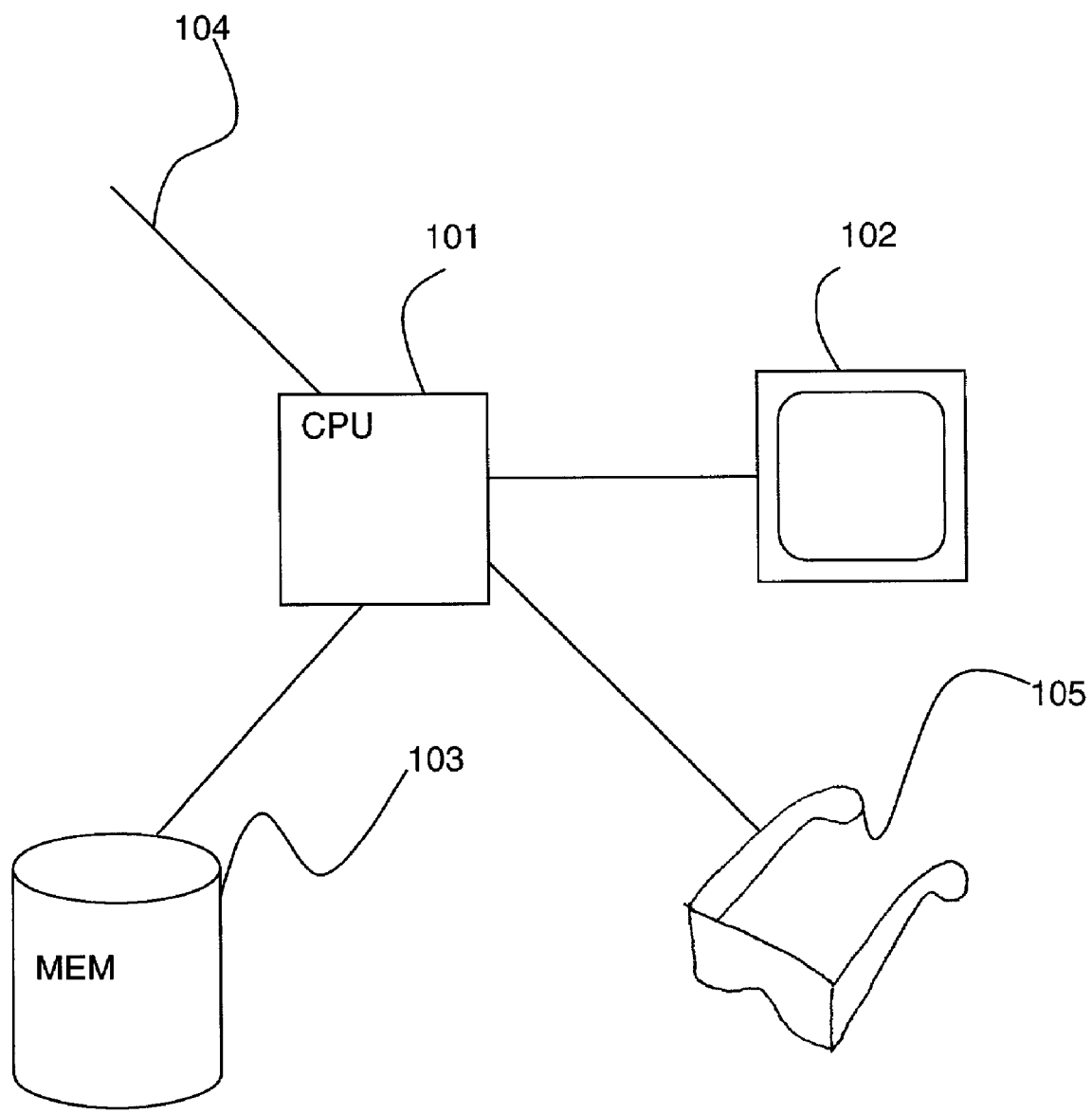
FIG. 1 shows a system in which the invention can be used.

FIG. 1 shows a typical 3-D image viewing apparatus, sometimes also referred to as a virtual reality device. The device includes a processor 101, a memory 103, and, optionally various peripherals, such as a display 102, a network connection 104, or other types of peripherals not shown, such as a printer, keyboard, mouse, microphone, loudspeakers, camera, and/or remote control device. The connections may be wired or wireless. The processor may be of any type including embedded in a PC, television, or set top box. The device may access additional processing or memory power via the network connection 104, which may be any suitable network connection such as to the Internet, cable television, and/or a local area network (LAN). Commonly the 3-D effect is achieved using a viewing device 105 that creates a stereo image, with the difference between the images shown to each of the two eyes of the viewer giving the illusion of three dimensions.

Figure 2:
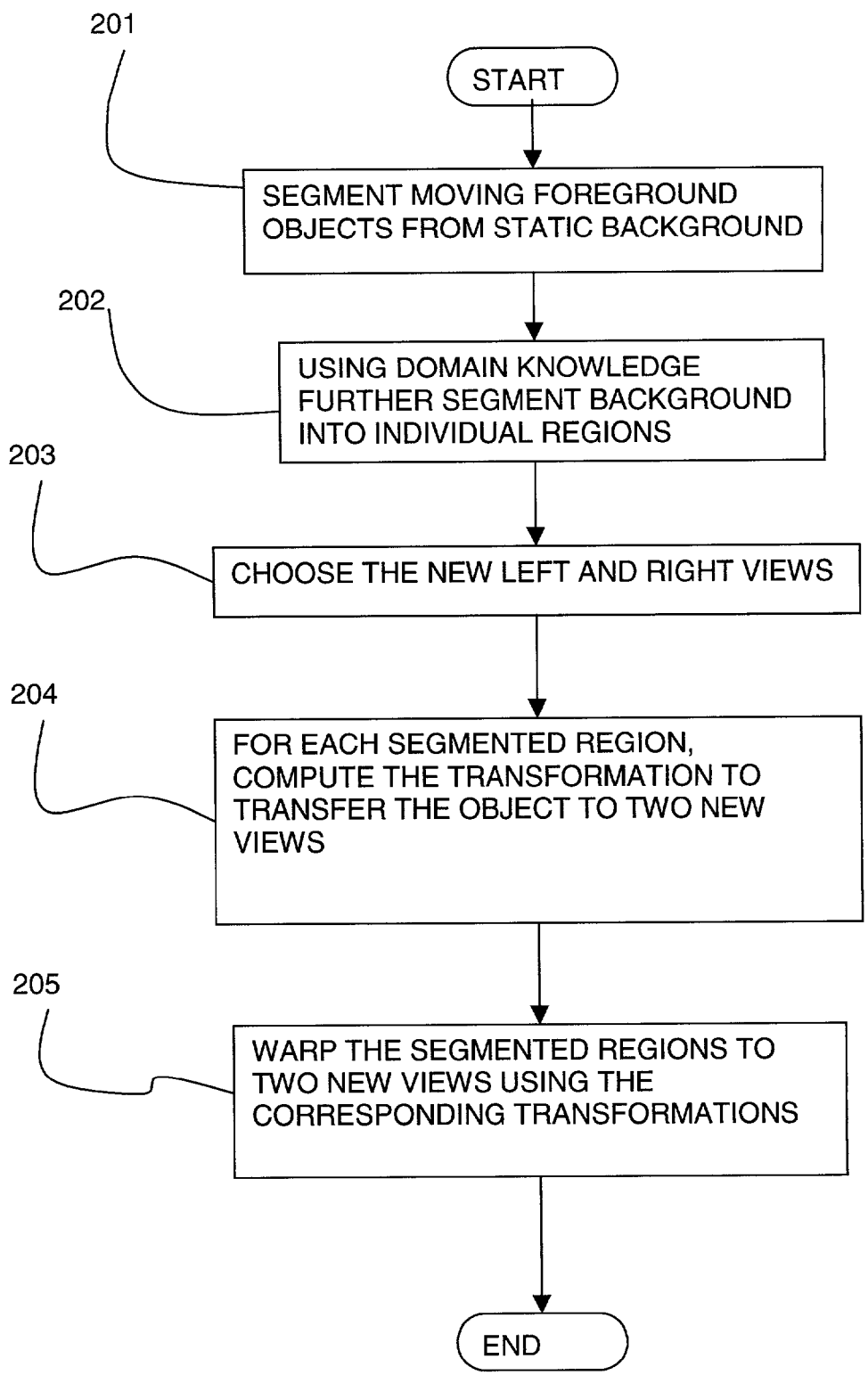
FIG. 2 shows a flowchart of the invention.

FIG. 2 shows a flowchart of the method according to the invention. The method may be executed by the processor 101 or at a remote processor accessed via network connection 104. Though the preferred embodiment is illustrated as software, it can equally well be implemented in hardware by the skilled artisan.

Figure 3:
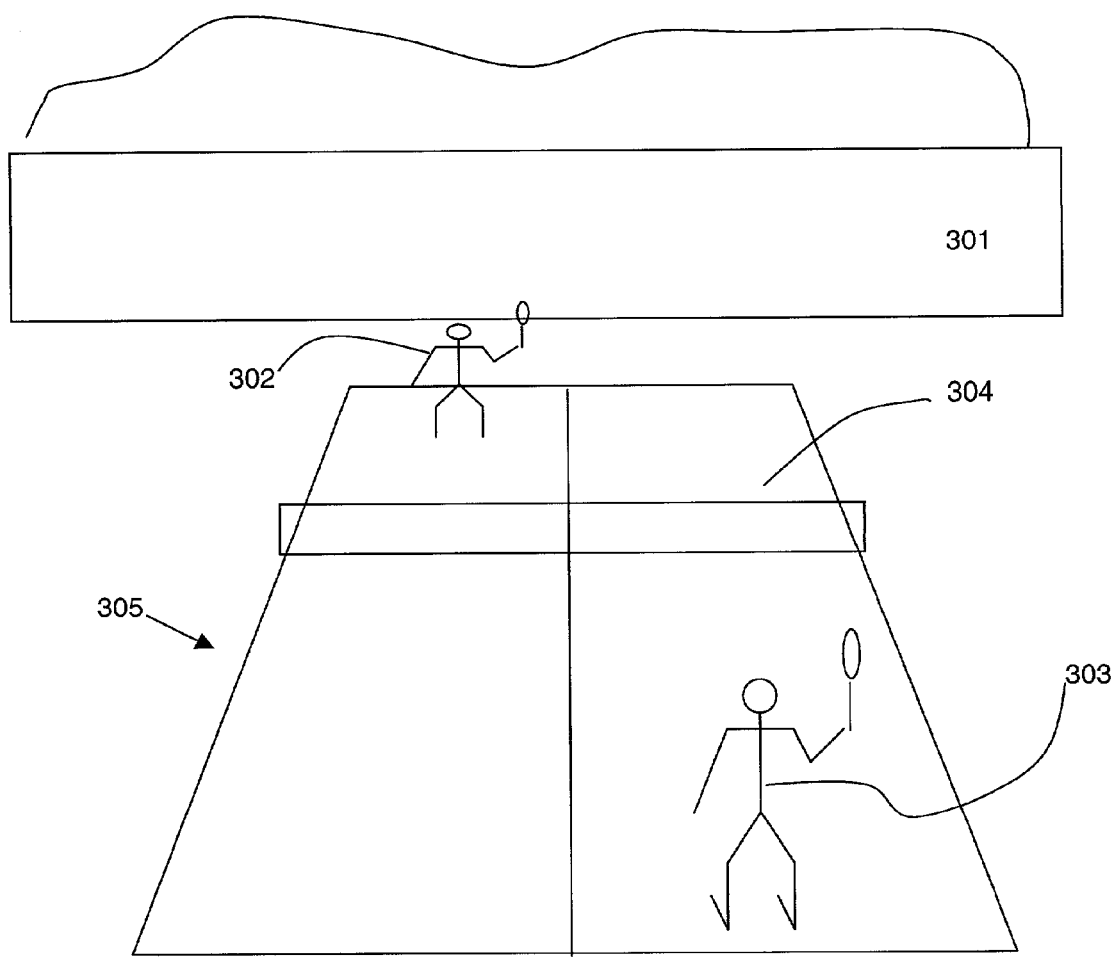
FIG. 3 shows a schematic of an image to be processed in accordance with the invention.

The invention will also be described with respect to the schematic image of FIG. 3. FIG. 3 shows a tennis game. Two players, 303 and 302, play on a court 304, in front of the stands 301 where the audience sits. The court 304 and stands 301 are known types of objects within a knowledge domain corresponding to tennis games.

The input is a sequence of images $I_1, I_2, I_3, \ldots$, for instance, taken during a tennis match. FIG. 2 shows the steps that are applied to generate two stereoscopic views of the scene. The letter "L" is used to refer to images and transformations relating to the left view of the stereoscopic output, while the letter "R" is used to refer to images and transformations relating to the right view.

At 201, moving objects are segmented from the stationary background. In this case, players 302 and 303 will be segmented. The details of the segmentation method will be discussed with respect to FIG. 4. Then at 202, domain knowledge is used to further segment the background into individual regions. More about box 202 will be discussed with respect to FIG. 5.

At 203, the new views are chosen. Details will be explained with respect to FIG. 6. The operations of boxes 202 and 203 may be performed in parallel.

Figure 7:
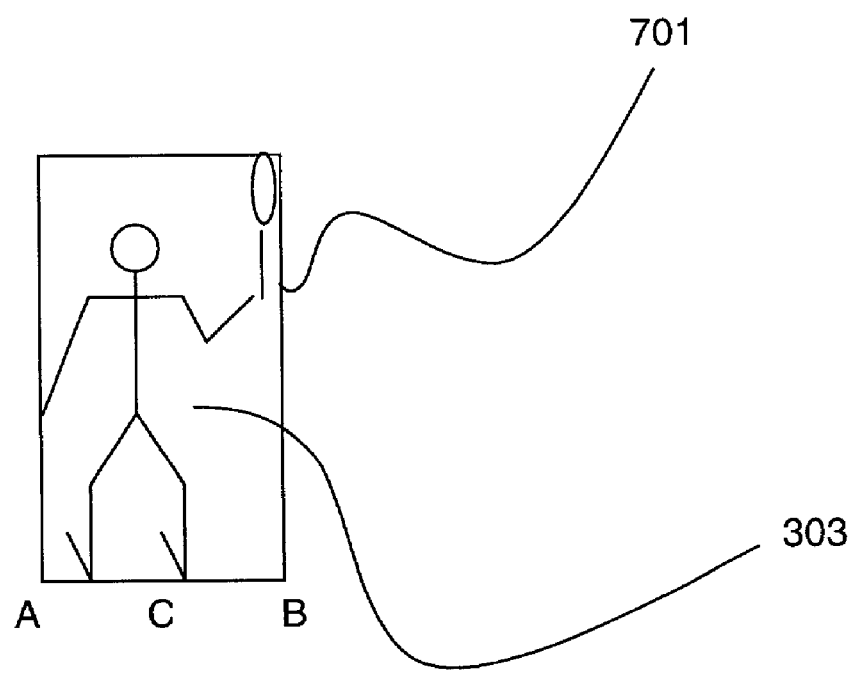
FIG. 7 illustrates how transformations of the segmented objects are computed.

At 204, for each region m, transformations $TL_m$ and $TR_m$ are computed. FIG. 7 illustrates the method.

Then, at 205, the segmented regions are warped to create the left view, using transformations $TL_m$. The regions are also warped to create the right view, using transformations $TR_m$. Details are discussed with respect to FIG. 8.

Segmentation of Moving Objects

Figure 4:
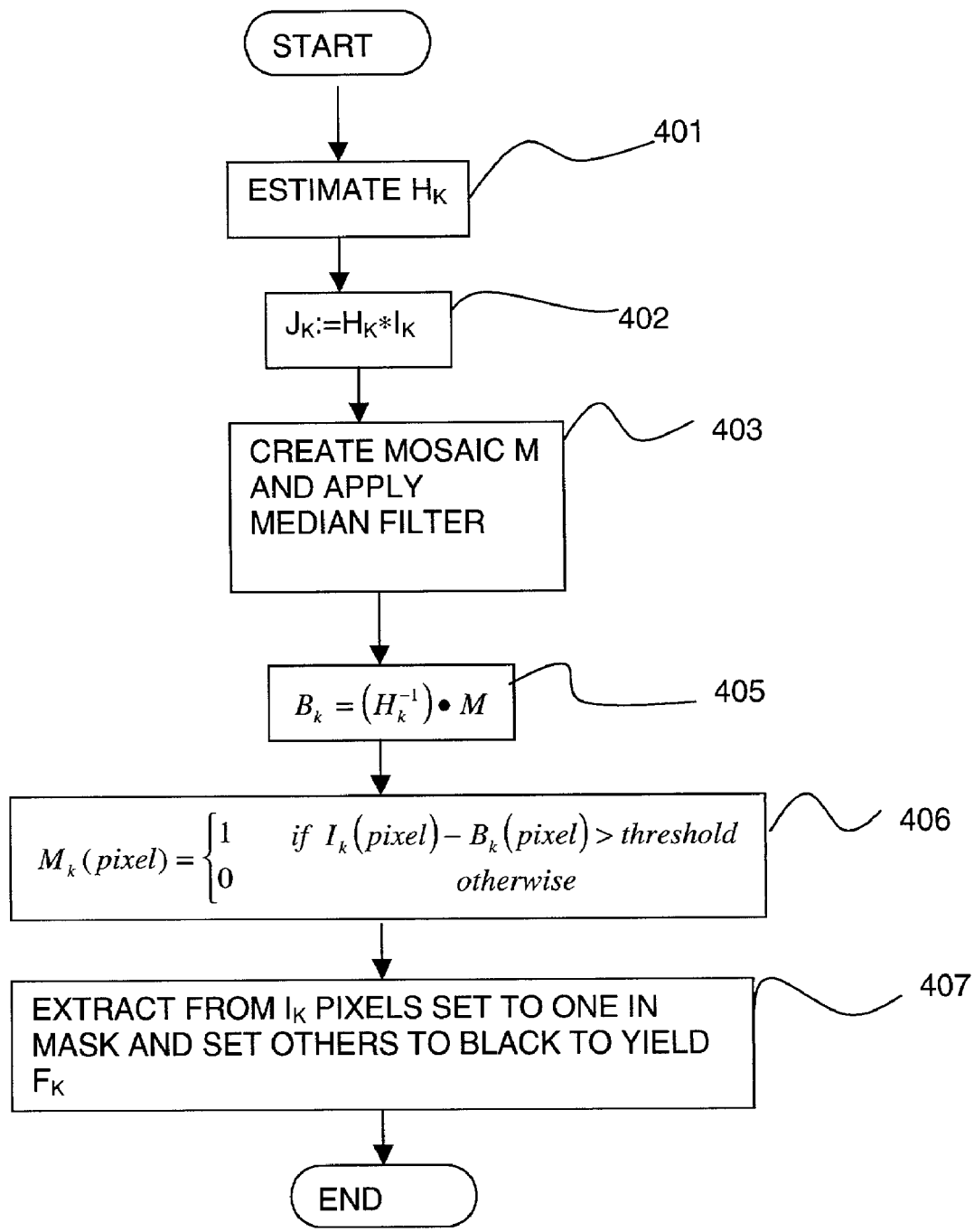
FIG. 4 shows segmentation of moving obj2ects.

FIG. 4 is a flowchart showing the steps performed in box 201. In boxes 402, 405, and 409, the symbol "•" is used to indicate the application of a homography to an image.

4a. At 401, for each input image $I_k$, estimate the homography transformation $H_k$ so that when $H_k$ is applied to frame $I_k$, the image of the tennis court in the transformed frame is aligned with the image of the tennis court in the first frame $I_1$.

A homography is represented by a 3×3 matrix H, which maps a point (x, y) in the image to the point represented by formula (1) from FIG. 9, where the $h_{ij}$ homography parameters are values from the homography matrix H. This is well known in the art, for example in O. Faugeras, *Three-dimensional Computer Visions* referenced above.

The alignment of input images is done by computing spatio-temporal derivatives of the image sequence, estimating normal flow, and linearly estimating the homography parameters. One method for achieving this is found in R. Pless et al, "Detecting Independent Motion: The Statistics of Temporal Continuity", Trans. IEEE PAMI, vol. 22, No. 8, August 2000.

Alternatively, feature points (such as corners) and/or lines could be located and matched between the input images and the homography could be estimated from the matched features, as shown in U.S. Pat. No. 5,629,988 issued to Burt et al.

At 402, $J_k$ denotes the result of applying transformation $H_k$ to the image $I_k$.

4b. From domain knowledge, it is known that in most tennis sequences the camera is allowed to pan, tilt, and zoom, but otherwise is not moved around the court. For a pan-tilt-zoom camera the transformation computed in box 401 aligns not only the tennis court, but also any other stationary feature in the scene. Only the moving players are not aligned.

The transformed images $J_k$ from step1 can be combined to create a mosaic of the scene at 403. For each pixel in the mosaic, there are one or more pixels from images $J_k$. In order to filter out moving objects (the players), a median filter is applied to the multiple values at each pixel and that median value is put into the mosaic M.

The median value is computed as follows. Suppose there are values $X_1, X_2, \ldots, X_K$ for a certain pixel. The values are sorted and the sorted values are denoted $y_1, y_2, \ldots, y_K$, where $y_1 <= y_2 <= \ldots <= y_K$. The median value is then $y_{K/2}$.

An alternative way to create mosaics can be found in U.S. Pat. No. 5,629,988.

4c. When an inverse transformation $(H_k^{-1})$ is applied to mosaic M and the result is cropped appropriately, a background image $B_k$ is obtained at 405. The background image is the same as the input image $I_k$, except that the moving objects are removed and replaced by pixels from the background, which were visible in other views.

4d. Then the input image $I_k$ is compared with the corresponding background image $B_k$ to create a mask image $M_k$ at 406, whose pixel values are 1 when the difference between $I_k$ and $B_k$ is larger than a threshold and 0 otherwise. Then at 407 from image $I_k$ those pixels are extracted that are set to 1 in the mask image $M_k$ and the remaining pixels are set to be black. The result is an image $F_k$ of moving objects.

Segmentation of Stationary Background

Figure 5:
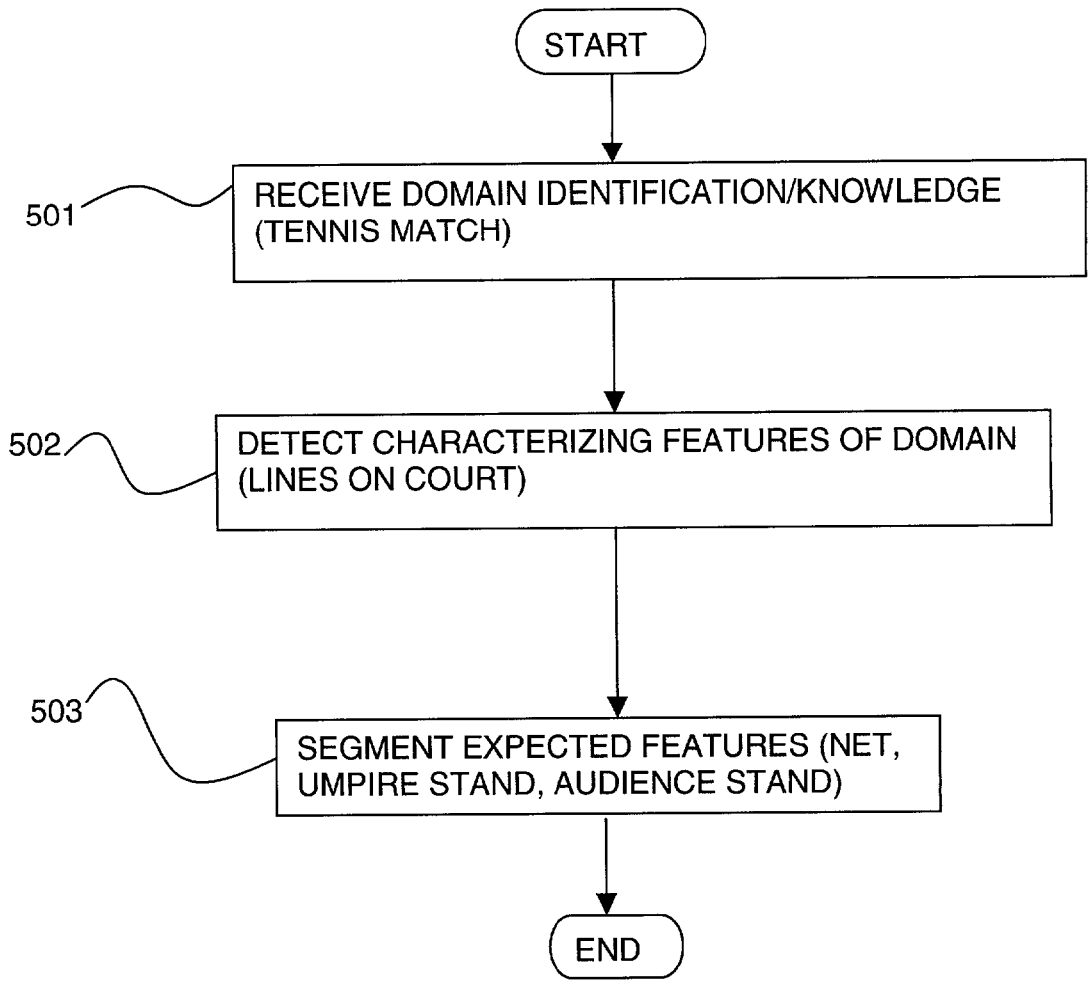
FIG. 5 shows a flowchart relating to use of domain knowledge and further segmentation of the stationary background into multiple regions.

FIG. 5 shows an expansion of box 202. Domain identification can be obtained at 501 from electronic program guide data or by analyzing the closed captioning data in broadcast video. Even if no domain identification is available, it is possible to test whether the input video is from the correct domain by detecting the distinguishing features (box 502). If the expected features are detected, the method can proceed even without domain identification.

Domain knowledge may also be supplied, for example, through MPEG stream meta-data, which could be available in digital TV broadcasts. If only domain identification is to be transmitted, then domain knowledge will have to be stored in advance in memory 103.

In the example of FIG. 3, the domain knowledge would include the shape of the court 305, the fact that the center net 304 is vertical, and certain assumptions about the shape of the stands 301.

At box 502, distinguishing features of the domain are detected. In the case of the tennis match, a distinguishing feature would be the lines of the court 305. An additional feature would be the knowledge that the color of the tennis court is uniform. The features are detected as follows:

5a. Locate lines in the image. There are many known methods for detecting lines in images, for example.

5b. Locate large regions of uniform color and select only those lines found in step 5a that are within such large regions.

5c. Match detected lines with line segments in the stored model. This is done by randomly choosing two or more detected line segments and matching them with all segments in the model. Each matching determines a transformation between the image and the model (this transformation is a homography, because the court is planar).

5d. For each homography obtained in step 5c, apply the transformation to the input image and find how many line segments in the transformed image match line segments in the model as well as how well such segments are aligned.

5e. Steps 5c. and 5d. are repeated and a final transformation is chosen. Under the final transformation, the most segments are matched and have the best alignment between the transformed input and the model.

At 503, the background is further segmented into the tennis court and other regions. In the case of the tennis match, these features might include the net, the umpire stand and the audience stands 301. The regions are segmented based on domain knowledge. For example, the net is in a known position with respect to the lines on the court. The umpire stand is known to be on the court itself and its color is different from the color of the court, so it can be segmented based on color. More about the type of segmentation necessary here can be found in Vishvjit S. Nalwa, *A Guided Tour of Computer Vision* (Addison-Wesley, 1993) section 3.3, "Image Segmentation".

As a result of this step, one mask image is obtained per region (analogously to the mask image obtained in 406). For each region, those mask pixels that correspond to pixels in that region are set to 1 and the other pixels are set to 0.

Determine Transformations of the Tennis Court

Figure 6:
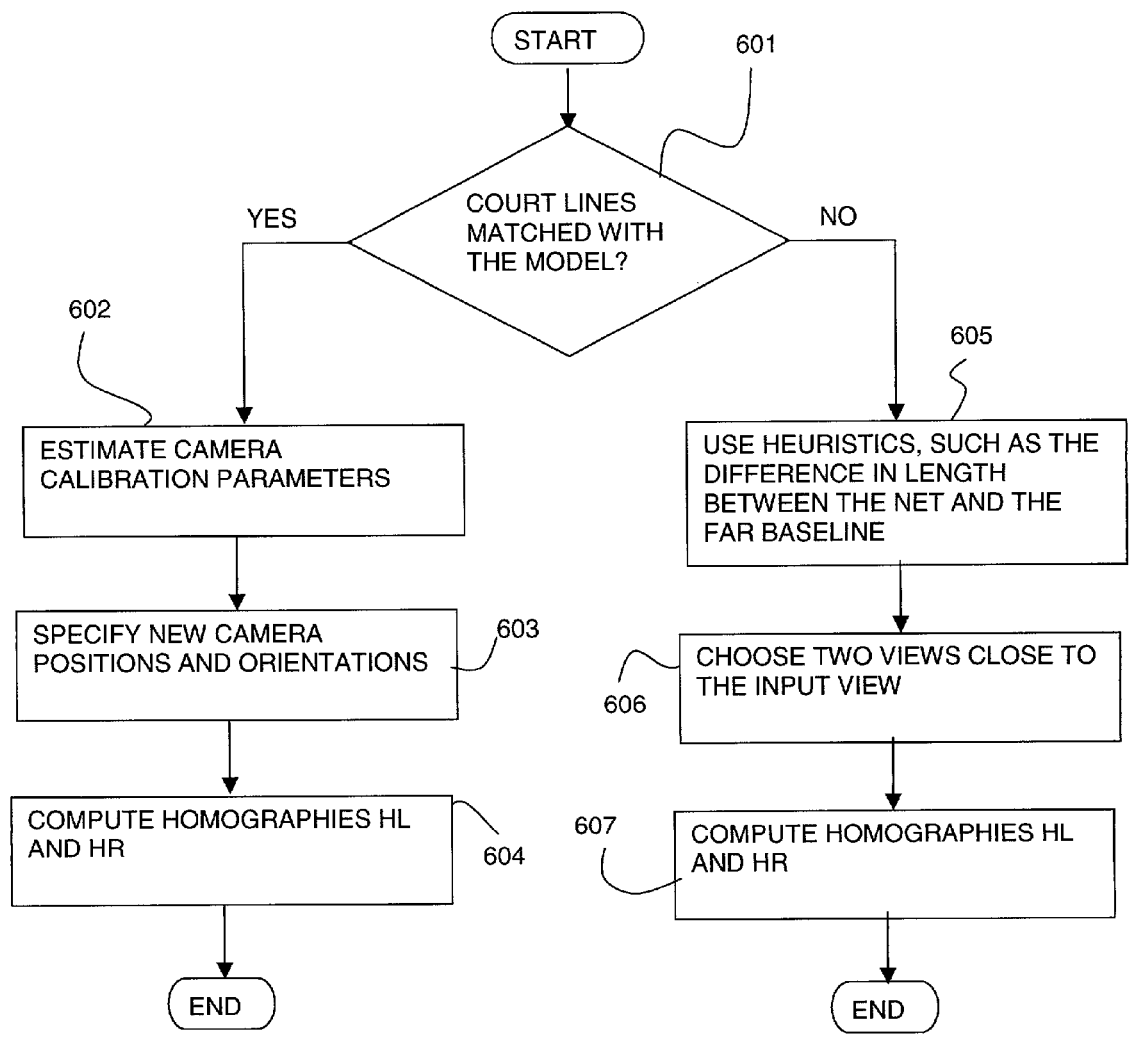
FIG. 6 illustrates aspects of how the new camera positions are derived.

In FIG. 6, the transformations to be applied to the image of the tennis court are determined. By tennis court, only the ground is implied herein. The transformations for the other segmented background regions are determined in the next section: "Determine transformations of other regions" The transformations are homographies, since the court is planar. There are two alternative ways of determining HL and HR.

6a. If the matching between the model and the input image is available (601, from box 502), the intrinsic and extrinsic calibration parameters (with respect to the court) can be determined 602. There are known techniques for doing so, for example in Emanuele Trucco, Alessandro Verri: "Introductory techniques for 3-D Computer Vision", Prentice Hall, 1998.

6b. In a fully calibrated case, any new desired camera position can be chosen 603. For example, the new cameras can be placed closer to the court to enhance 3D perception. The homographies HL and HR can be determined in closed form from the old and the new camera parameters 604. How to do this is described in the Trucco & Verri book referenced above.

6c. If the system is not fully calibrated (calibration is not desired), heuristics 605 are used to determine HL and HR. In this particular example, suppose the net and the far baseline are approximately horizontal in the input image. For the bottom edge of the net, the Y-coordinate will be denoted by $y_1$ and the width in the image by $w_1$. For the far baseline, the Y-coordinate will be denoted by $y_2$ and the width by $w_2$.

Because the two line segments have the same length in the 3D world, the ratio of $w_1/w_2$ is the same as the ratio of disparities for the two lines, in accordance with formula (13).

Similarly, the Y-coordinate of the bottom scan line will be denoted in the image by $y_B$. For each viewing device, the disparities should be smaller than a certain maximum, denoted by $d_{MAX}$. The maximum $d_{MAX}$ might be, for example, 20 pixels.

Utilizing formula (4), the values for $s_L$, $s_R$, $d_L$ and $d_R$ may be derived. Of course, this is just one of a possible set of solutions. At 606, by choosing $s_R=0$ and $d_R=0$, the right view can be made identical to the input view. To obtain $s_L$ and $d_L$, the two linear equations at (14) are solved, one obtained from (13) and one from the maximum disparity constraint.

The values $y_1$, $y_2$, $w_1$, $w_2$ and $y_B$ are measurements in the input image and $d_{MAX}$ is a known parameter of the viewing system, so $s_L$ and $d_L$ are the only unknowns in the equations above.

Consequently, the homographies of formulae (2) and (3) of FIG. 9 can be used 607.

These two homographies do not change the Y coordinate and thus create rectified stereo views, where corresponding features lie on the same scan lines in both images.

The heuristic described above is only an example. If other known features on the court can be detected, analogous methods can be used to determine suitable homographies HL and HR.

Determine Transformations of other Regions

In addition to the tennis court, the scene contains moving objects (segmented in 407) and segmented parts of the background (from 503). With reference to FIG. 7, it will now be explained how transformations TLm and TRm can be obtained for these regions. The procedure is explained for the segmented player regions, but the same (or quite similar) procedure can be applied to other regions.

If the new view is similar to the original view (which is usually the case), the player is approximated as being in a fronto-parallel plane. This is a valid approximation considering the distance between the player and the camera. The TLm transformation is determined with respect to a bounding rectangle 701 around the region containing the foreground object 303. The lower left corner is denoted as A, the lower right corner as B, and the mid-point between A and B as C. The player 303 is assumed to be standing on the court and therefore the lower line of the bounding rectangle 701 is assumed to lie on the ground. The tennis court is transformed by homography HL. Specifically, homography HL transforms points A, B, C to points A', B', C', respectively, in the new view.

TLm must be compatible with HL: Point C should be transformed to C' and the horizontal distance between transformed points A, B should equal the horizontal distance between points A', B'. Finally, the aspect ratio (width divided by height) of the bounding box should remain constant. Consequently, formula (5) is derived.

Formulae (6), (7), (8), (9), (10), and (11) of FIG. 9 are variable definitions for formulae (12) of FIG. 10. In each of the formulae (6)–(11) x and y coordinates are defined for points in FIG. 7 and their transforms.

The transformation for the right view TRm, per formula (18) can be derived analogously, The variables appearing in the formula for TR are defined in formula (19). These in turn are derived from the assumption that homography HR transforms points A, B, C, to points A", B", C", where these points are defined in formulae (15), (16) and (17) respectively.

The objects (for example the tennis players) appear to "stand out", because they are transformed differently from the tennis court (the ground). The transformations of the tennis court (the HL and HR homographies) are setup so that points higher in the image appear farther from the viewer. On the other hand, all the points on the tennis player appear at approximately the same distance from the viewer.

The transformations TLm and TRm differ from the transformations HL and HR that are applied to the ground portion of tennis court. Consequently, the tennis player appears to "stand out" from the background. More specifically, the HL and HR transformations are generally constructed so that points on the far side of the court have smaller disparities and thus appear farther from the viewer. This creates a correct, slanted appearance of the court. On the other hand, the TLm and TRm transformations make all the points of the tennis player appear at approximately the same distance.

The player's feet have approximately the same disparity as the nearby points of the court. Also, the disparity of the player's head will be approximately the same. However, points on the court that appear close to the player's head have smaller disparities and this makes the player "stand out" from the background. Other features, such as the umpire stand, are transformed analogously to the tennis players and thus also appear to "stand out" from the background.

Creating the New Views

Figure 8:
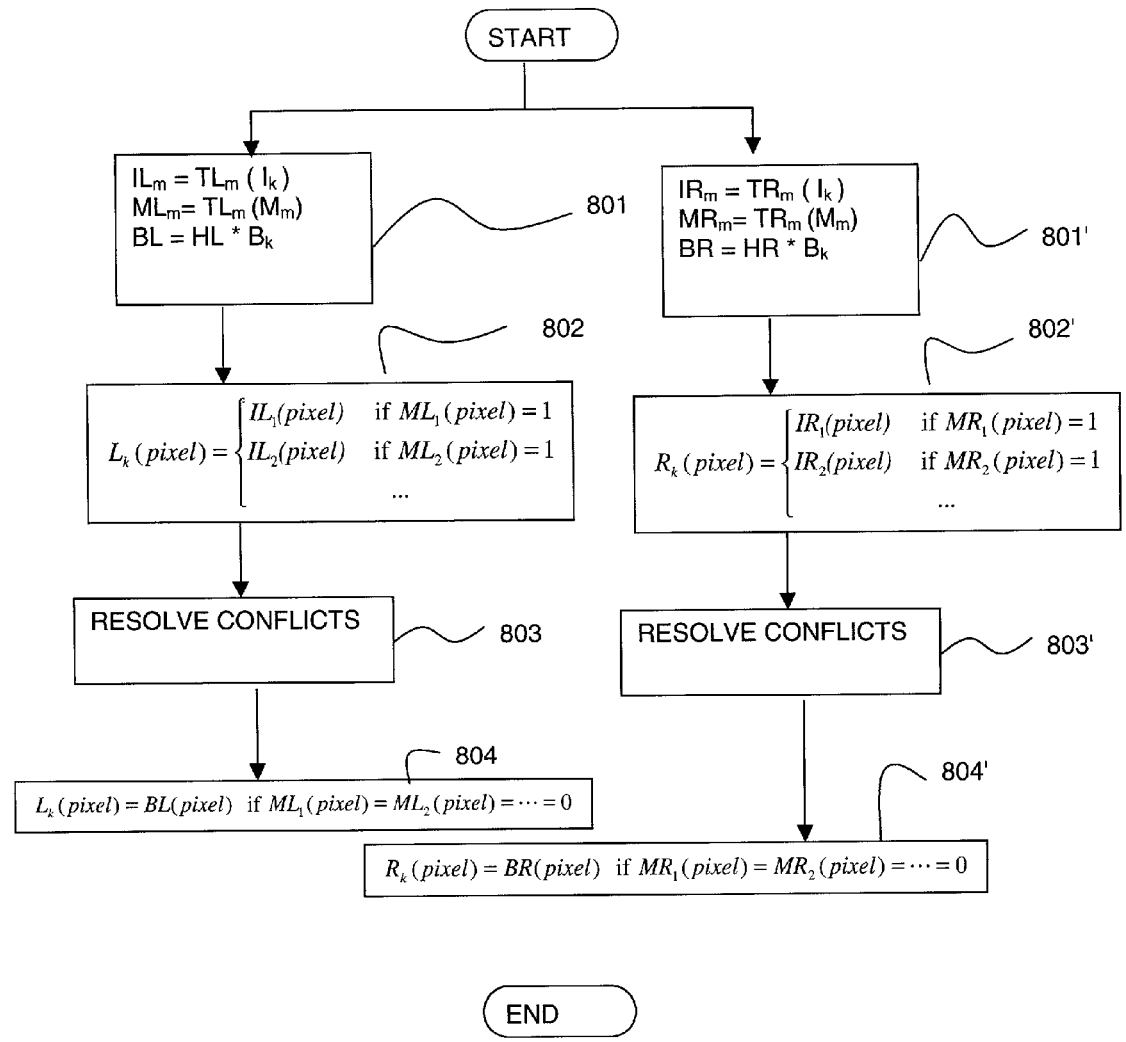
FIG. 8 shows how the new views are created.

Finally, the new views are created as described in FIG. 8. In previous steps, the input image was segmented into multiple regions and a transformation was computed for each region. In FIG. 8 there are two paths. The left path corresponds to generation of the left view and the right path corresponds to generating the right view. The two paths are shown as being executed in parallel; however, they might equally well be executed sequentially.

At 801, the respective left view transformation TLm is applied to the image region, $I_k$, and also to each mask, $M_k$, to yield transformed image region ILm and transformed mask MLm. HL is also applied to the background mosaic $B_K$, created in box 405. For the ground portion of tennis court, the transformation TLm is the homography HL.

At 802, the transformed regions are combined to create the new left view. Whenever a pixel in the transformed mask MLm is 1, the corresponding pixel in ILm is copied to the output image.

At 803, conflicts resulting from overlapping objects are resolved.

If for some a, b, the objects overlap, i.e., $ML_a$(pixel)=1 and $ML_b$(pixel)=1, then $L_k$(pixel) should be set to the pixel IL(pixel) from the closest object, with object ordering defined below.

Object Ordering:

For each object, the bottom edge should be taken to yield its position on the reference plane. Closer objects then have the bottom edge lower in the input image. The reference plane (the tennis court) is ordered as the most distant objects.

Also at 804, optionally, holes may be filled, where holes are pixels that are not covered by the segmented objects. If the black pixels are on the boundary, they should be left untouched, because they most likely correspond to locations never seen in the scene. On the other hand, the appropriate values from the background mosaic can fill holes inside the image, if such values are available.

Boxes 801', 802', 803', and 804' are analogous to 801–804, respectively, with R, i.e. the right view, replacing L, i.e. the left view.

The example of FIGS. 4–8 is worked out in terms of a device that uses stereo images to create a 3-D effect. However, the method is extendable to an implementation with an arbitrary number of views. The computation of the right view, that is, computation of HR, TRm etc. was completely independent of the computation of the left view (HL, TLm, etc.). Thus it is straightforward to generate N different views of the scene by repeating the algorithm N times. Typically, the N views would be generated according to the requirements of a particular display device.

Alternate Embodiment for Transformation of Background Pixels

An alternate embodiment for dealing with background areas can be derived from use of a second image of the same scene. In the following, it will be assumed that moving objects are already segmented from the image. The operations below may be used to estimate the appearance of stationary objects not on the reference plane (the tennis court), in accordance with the following 1. First correspondences between pixels in the two images are established, manually, or automatically, see "Chapter 6 Stereo Vision", Three Dimensional Computer Vision, Olivier Faugeras, MIT Press, 1993.
2. The first images are registered up to an affine transform:
   a. two corresponding pairs of parallel lines on a plane are identified in accordance with formulae (20) and (21). The copairs of lines are denoted by PL1=[L11, L12] and PL2=[L21, L22], where L11, L12, L21, L22, are lines defined by endpoints $L_{ij}$=[$(sx_{ij}, sy_{ij})$, $(ex_{ij}, ey_{ij})$].
   b. The vanishing point (in homogeneous coordinates) for each pair of parallel lines is computed in accordance with formulae (20) and (21), where the notation of the cross product of a and b is shown in formula (22).
   c. The transform $H_a$ that moves $vp_1$=[$x_1$ $y_1$ $w_1$] and $vp_2$=[$x_2$ $y_2$ $w_2$] to infinity is computed in accordance with formula (23).
   d. Apply $H_a$ to the whole image, i.e., pixel according to formula (24) is moved according to formula (25).
3. Find 4 or more points on a plane in the first image and their corresponding points in the second image. In accordance with formula (26) the transform $H_b$ is computed.

This transform moves these points in second image $q_1$ $q_2$ $q_3$ $q_4$, . . . to align with those in the first image (after applying $H_a$), $p_1'$, $p_2'$, $p_3'$, $p_4'$, . . . :

Thereafter, $H_b$ is applied to the whole image, i.e., the pixel in accordance with formula (2) is moved to the pixel in accordance with formula (28).

4. Using 2 pairs of corresponding points $p_a'$ and $p_b'$ in the first image, and $q_a'$ and $q_b'$ in the second image, the epipoles between the transformed input images and the output image are computed. If e12 denotes the epipole between the input images, e12' denotes the epipole between the transformed first image and the output image, e22' denotes the epipole between the transformed second image and the output image, then—in homogeneous coordinates—formulae (29) and (30) are obtained., which corresponds to formula (31) in real coordinates:

where w is a ratio.

5. For each corresponding points $p_i$ in the transformed first image and $q_i$ in the transformed second image, the location $r_i'$ is computed in homogenous coordinates in accordance with formula (32) for the point in the new view.
6. All points $r_i'$, are moved to the point $r_i$ in accordance with formula (33), where $e_{12}'$= [$ex_{12}'$ $ey_{12}'$], and d is a constant.

Thus, when two images are used, there is effectively a separate transformation for each pixel of the stationary background, while in the first described embodiment, the background is covered by one or more transformations, each of which relates to a number of pixels.

The disparity in the registered images depends only on the translation between the centers of the two cameras. In generating the new view, one can change the disparity to agree with the translation with respect to the location of the center of the new camera. Such a transformation is described in: M. Irani, P. Anandan, D. Weinshall, "From Reference Frames to Reference Planes: A New Framework for 3D Scene Analysis". Proceedings: Fifth European Conference on Computer Vision, Freiburg, June 1998.

From reading the present disclosure, other modifications will be apparent to persons skilled in the art. Such modifications may involve other features that are already known in the design, manufacture and use of virtual reality type systems and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom. In particular, although claims are formulated herein for a method, Applicant reserves the right to add apparatus and software claims in the future.

The word "comprising", "comprise", or "comprises" as used herein should not be viewed as excluding additional elements. The singular article "a" or "an" as used herein should not be viewed as excluding a plurality of elements.

What is claimed is:

1. An image processing method for use on a data processing device, the method comprising the acts of:
    receiving at least one monocular video input image $I_k$;
    segmenting at least one foreground object from the input image $I_k$;

wherein the act of segmenting at least one foreground object from the input image further comprises:

applying a homography transformation $H_k$ to the at least one monocular video input image $I_k$ to create at least one transformed image $J_k$;

combining the at least one transformed images $J_k$ to create a mosaic M;

applying a median filter to the multiple values at each pixel of said mosaic M to derive a median value at each of said pixels in said mosaic M;

applying an inverse homography transformation $H_k^{-1}$ to said mosaic M to derive at least one background image $B_k$;

comparing the at least one background image $B_k$ with the at least one input image $I_k$ to create at least one mask image $M_k$;

extracting those pixels from the monocular input image $I_k$ that are set to one in the mask image M; and setting the remaining pixels in the monocular input image $I_k$ not set to one at said extracting act in the mask image M to black resulting in the identification of said at least one foreground object from the input image $I_k$;

applying a respective left (TLm) and right (TRm) transformation to each segmented foreground object and a respective left (HL) and right (HR) background transformation to the background, for each of a plurality of output images;

combining the respective left transformation ($TL_m$) corresponding to each segmented foreground object with the respective left background transformation (HL) corresponding to the background to generate a left view $L_k$ for each of said plurality of output images;

combining the respective right transformation (TRm) corresponding to each segmented foreground object with the respective right background transformation (HR) corresponding to the background to generate a right view $R_k$ for each of said plurality of output images; and deriving the plurality of output images from the results of the respective transformations.

2. The method of claim 1, further comprising second segmenting at least one background object from the input image and applying a respective transformation to each segmented background object for each of the plurality of output images.

3. The method of claim 1, wherein there are two output images and two respective transformations are applied to each segmented object and two transformations are applied to the background to create the two output images.

4. The method of claim 1, further comprising displaying the plurality of output images, so that the plurality of output images are perceivable by a user as a single image having enhanced three dimensional appearance.

5. The method of claim 1, wherein the respective transformations wherein the respective transformations applied to the foreground object make the foreground object stand out from the background.

6. The method of claim 1, wherein
the receiving comprises receiving a multiplicity of monocular input images;
the deriving comprises deriving a respective plurality of output images for each of the monocular input images;
the method further comprises displaying the respective pluralities of output images in a combining device, so that the respective pluralities of output images are perceivable by a user as a sequence of single images giving an illusion of motion and having an enhanced three dimensional appearance in which the at least one foreground object moves separately from the at least one background object.

7. The method of claim 6, wherein the at least one foreground object appears to move in the output images, while at least a portion of the rest of the image appears not to move.

8. The method of claim 1, wherein the segmenting and applying involve using domain knowledge to recognize positions of expected objects in the monocular input image and derive positions of objects in the output images.

9. The method of claim 1, wherein the respective transformations for background pixels are derived by comparing at least two monocular input images of a single scene.

10. The method of claim 1, further comprising, prior to applying the transformation, approximating a position of each segmented object as appearing on a fronto-parallel plane.

11. An image processing device comprising
an input for receiving at least one monocular video input image;
at least one processor adapted to perform the following operations segmenting at least one foreground object from the input image;
wherein the operation of segmenting at least one foreground object from the input image, further comprises:

applying a homography transformation $H_k$ to the at least one monocular video input image $I_k$ to create at least one transformed image $J_k$;

combining the at least one transformed images $J_k$ to create a mosaic M;

applying a median filter to the multiple values at each pixel of said mosaic M to derive a median value at each of said pixels in said mosaic M;

applying an inverse homography transformation $H_k^{-1}$ to said mosaic M to derive at least one background image $B_k$;

comparing the at least one background image $B_k$ with the at least one input image $I_k$ to create at least one mask image $M_k$;

extracting those pixels from the monocular input image $I_k$ that are set to one in the mask image M; and setting the remaining pixels in the monocular input image $I_k$ not set to one at said extracting act in the mask image M to black resulting in the identification of said at least one foreground object from the input image $I_k$;

applying a respective left (TLm) and right (TRm) transformation to each segmented foreground object and a respective left (HL) and right (HR) background transformation to the background, for each of the plurality of output images;

combining the respective left transformation ($TL_m$) corresponding to each segmented foreground object with the respective left background transformation (HL) corresponding to the background to generate a left view $L_k$ for each of said plurality of output images;

combining the respective right transformation (TRm) corresponding to each segmented foreground object with the respective right background transformation (HR) corresponding to the background to generate a right view $R_k$ for each of said plurality of output images; and deriving the plurality of output images from the results of the respective transformations.

12. The device of claim 11, wherein the operations further comprise second segmenting at least one background object from the input image and applying a respective transformation to each segmented background object for each of the plurality of output images.

13. The device of claim 11, wherein
there are two output images; and
the operations further comprise, in order to create the two output images:
applying two respective transformations to each segmented object; and
further applying two transformations to the background.

14. The device of claim 11, further comprising a combining display unit adapted to receive and display the plurality of output images, so that the plurality of output images are perceivable by a user as a single image having enhanced three dimensional appearance.

15. The device of claim 11, wherein the respective transformations applied to the foreground object make the foreground object stand out from the background.

16. The device of claim 15, wherein
the receiving comprises receiving a multiplicity of monocular input images;
the deriving comprises deriving a respective plurality of output images for each of the monocular input images;
the device further comprises a combining display unit for receiving and displaying the respective pluralities of output images, so that the respective pluralities of output images are perceivable by a user as a sequence of single images giving an illusion of motion and having an enhanced three dimensional appearance in which the at least one foreground object moves separately from the at least one background object.

17. The device of claim 16, wherein the at least one foreground object appears to move in the output images, while at least a portion of the rest of the image appears not to move.

18. The device of claim 11, wherein the segmenting and applying operations involve using domain knowledge to recognize positions of expected objects in the monocular input image and derive positions of objects in the output images.

19. The device of claim 11, wherein the respective transformations for background pixels are derived by comparing at least two monocular input images of a single scene.

20. The device of claim 11, wherein the operations further comprise, prior to applying the transformation, approximating a position of each segmented object as appearing on a fronto-parallel plane.

21. At least one medium readable by a data processing device and embodying code for causing execution of the following operations:
receiving at least one monocular video input image;
wherein the operation of segmenting at least one foreground object from the input image, further comprises:
applying a homography transformation $H_k$ to the at least one monocular video input image $I_k$ to create at least one transformed image $J_k$;
combining the at least one transformed images $J_k$ to create a mosaic M;
applying a median filter to the multiple values at each pixel of said mosaic M to derive a median value at each of said pixels in said mosaic M;
applying an inverse homography transformation $H_k^{-1}$ to said mosaic M to derive at least one background image $B_k$;
comparing the at least one background image $B_k$ with the at least one input image $I_k$ to create at least one mask image $M_k$;
extracting those pixels from the monocular input image $I_k$ that are set to one in the mask image M; and
setting the remaining pixels in the monocular input image $I_k$ not set to one at said extracting act in the mask image M to black resulting in the identification of said at least one foreground object from the input image $I_k$;
segmenting at least one foreground object from the input image
applying a respective left (TLm) and right (TRm) transformation to each segmented foreground object and a respective left (HL) and right (HR) background transformation to the background, for each of the plurality of output images;
combining the respective left transformation ($TL_m$) corresponding to each segmented foreground object with the respective left background transformation (HL) corresponding to the background to generate a left view $L_k$ for each of said plurality of output images;
combining the respective right transformation (TRm) corresponding to each segmented foreground object with the respective right background transformation (HR) corresponding to the background to generate a right view $R_k$ for each of said plurality of output images.

22. The medium of claim 21, wherein the operations further comprise second segmenting at least one background object from the input image and applying a respective transformation to each segmented background object for each of the plurality of output images.

23. The medium of claim 21, wherein there are two output images and two respective transformations are applied to each segmented object and two transformations are applied to the background to create the two output images.

24. The medium of claim 21, wherein the operations further comprise displaying the plurality of output images in a combining device, so that the plurality of output images are perceivable by a user as a single image having enhanced three dimensional appearance.

25. The medium of claim 21, wherein the respective transformations applied to the foreground object make the foreground object stand out from the background.

26. The medium of claim 25, wherein The receiving comprises receiving a multiplicity of monocular input images;
the deriving comprises deriving a respective plurality of output images for each of the monocular input images;
the operations further comprise displaying the respective pluralities of output images in a combining device, so that the respective pluralities of output images are perceivable by a user as a sequence of single images giving an illusion of motion and having an enhanced three dimensional appearance in which the at least one foreground object moves separately from the at least one background object.

27. The device of claim 16, wherein the at least one foreground object appears to move in the output images, while at least a portion of the rest of the image appears not to move.

28. The medium of claim 21, wherein the segmenting and applying operations involve using domain knowledge to recognize positions of expected objects in the monocular input image and derive positions of objects in the output images.

29. The medium of claim 21, wherein the respective transformations for background pixels are derived by comparing at least two monocular input images of a single scene.

30. The medium of claim 21, wherein the operations further comprise, prior to applying the transformation, approximating a position of each segmented object as appearing on a fronto-parallel plane.

* * * * *